US008645744B2

(12) United States Patent
Jonnagadla et al.

(10) Patent No.: US 8,645,744 B2
(45) Date of Patent: *Feb. 4, 2014

(54) FAULT SURVEILLANCE AND AUTOMATIC FAIL-OVER PROCESSING IN BROKER-BASED MESSAGING SYSTEMS AND METHODS

(75) Inventors: Suresh S. Jonnagadla, Laurel, MD (US); Shailender Gola, North Potomac, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 194 days.

This patent is subject to a terminal disclaimer.

(21) Appl. No.: 13/292,466

(22) Filed: Nov. 9, 2011

(65) Prior Publication Data

US 2012/0054536 A1 Mar. 1, 2012

Related U.S. Application Data

(63) Continuation of application No. 12/610,123, filed on Oct. 30, 2009, now Pat. No. 8,078,902.

(51) Int. Cl.
*G06F 11/00* (2006.01)
(52) U.S. Cl.
USPC ............... 714/2; 714/4.1; 714/38.1; 709/206

(58) Field of Classification Search
USPC ............................. 714/2, 38.1, 4.1; 709/206
See application file for complete search history.

(56) References Cited

U.S. PATENT DOCUMENTS

| | | | |
|---|---|---|---|
| 5,608,783 A * | 3/1997 | Ichnowski et al. ......... 379/88.18 |
| 7,188,273 B2 * | 3/2007 | Allen et al. .................... 714/6.3 |
| 2009/0125595 A1 * | 5/2009 | Maes ............................ 709/206 |
| 2010/0304717 A1 * | 12/2010 | Bhatt et al. ................. 455/412.1 |

\* cited by examiner

*Primary Examiner* — Charles Ehne

(57) ABSTRACT

An exemplary method includes a message broker subsystem 1) attempting to deliver one or more messages intended for a recipient software application to the recipient software application, 2) determining that the recipient software application is in a fault state after failing to deliver the one or more messages to the recipient software application, 3) automatically performing a fail-over process on one or more other messages intended for the recipient software application in response to the determination that the recipient software application is in the fault state, and 4) continuing to attempt to deliver a message selected from the one or more messages to the recipient software application while automatically performing the fail-over process on the one or more other messages. Corresponding methods and systems are also disclosed.

21 Claims, 13 Drawing Sheets

1100

Broker Information Table

| Broker Name | Location IP Address | Location Port Number |
|---|---|---|
| Broker A | 111.191.221.65 | 7123 |
| Broker B | 155.159.211.39 | 4554 |
| Broker C | 122.125.135.145 | 3778 |
| Broker D | 165.167.169.19 | 3434 |

Software Application Information Table

| Software Application Name | Associated Broker Name | Alternative Software Application for Fail-over Processing |
|---|---|---|
| Application 1 | Broker A | Application 3, Application 6 |
| Application 2 | Broker D | |
| Application 3 | Broker B | Application 1 |
| Application 4 | Broker A | Application 2, Application 5 |
| Application 5 | Broker C | |
| Application 6 | Broker C | |
| Application 7 | Broker B | Application 5 |
| Application 8 | Broker D | |
| Application 9 | Broker A | |
| Application 10 | Broker C | |

Fig. 12

FAULT SURVEILLANCE AND AUTOMATIC FAIL-OVER PROCESSING IN BROKER-BASED MESSAGING SYSTEMS AND METHODS

RELATED APPLICATIONS

This application is a continuation application of U.S. patent application Ser. No. 12/610,123, filed on Oct. 30, 2009, and entitled "Fault Surveillance and Automatic Fail-Over Processing in Broker-Based Messaging Systems and Methods," which is hereby incorporated by reference in its entirety.

BACKGROUND INFORMATION

Message-oriented middleware is infrastructure that increases the interoperability, portability, and flexibility of software applications by allowing the software applications to communicate one with another by transmitting messages therebetween. Message-oriented middleware reduces the complexity of developing software applications that span multiple operating systems and network protocols by insulating application developers from the details of the various operating system and network interfaces. Accordingly, software developers can more easily integrate new software applications with existing software applications.

In typical message-oriented middleware configurations, messages are transmitted from one software application to another by way of a message broker. However, in some instances, a particular software application may be in a fault state during which it is unable to receive messages from a message broker. For example, a network connection used to transport messages between the message broker and the software application may be temporarily disabled and/or the software application itself may have one or more glitches, bugs, or other problems.

A typical message broker that receives a message intended for a software application that is in a fault state will repeatedly attempt to deliver the message to the software application for a predetermined time interval before determining that the message is undeliverable and returning it to an originating software application, even if the message broker has already failed to deliver other messages to the software application. Such repeated attempts to deliver each message intended for a software application in a fault state can cause undesirable delays, consume valuable network resources, and result in frustrating experiences for end users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 11 shows an exemplary broker information table according to principles disclosed herein.

FIG. 12 shows an exemplary software application information table according to principles disclosed herein.

DETAILED DESCRIPTION OF PREFERRED EMBODIMENTS

Figure 1:
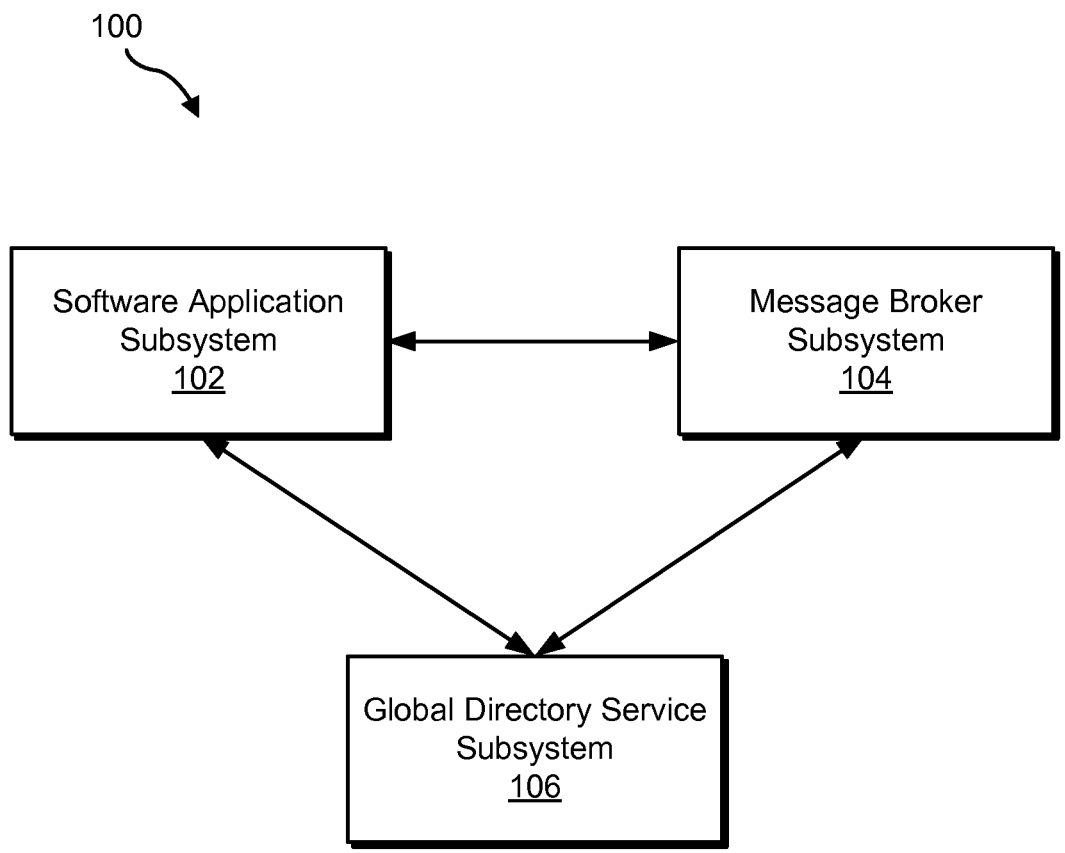
FIG. 1 illustrates an exemplary broker-based messaging system according to principles disclosed herein.

Exemplary methods and systems for performing fault surveillance and automatic fail-over processing in a broker-based messaging system are described herein. As described in more detail below, a message broker subsystem may attempt to deliver one or more messages intended for a recipient software application to the recipient software application during a predetermined fault interval. The message broker subsystem may determine that the recipient software application is in a fault state after failing to deliver the one or more messages to the recipient software application during the predetermined fault interval. In response to this determination, the message broker subsystem may automatically perform a fail-over process on the one or more messages and/or one or more other messages intended for the recipient software application. For example, the message broker subsystem may automatically attempt to deliver the one or more messages and/or one or more other messages to another software application that has been designated as an alternative recipient software application to the recipient software application. Alternatively, the message broker subsystem may return one or more messages intended for the recipient software application to a software application that originated the one or more messages.

By automatically performing a fail-over process on one or more messages intended for a recipient software application that has been determined to be in a fault state, time and resources associated with attempting to deliver the one or more messages to the recipient software application may be minimized or avoided.

As used herein, the term "software application" may refer to any software instance such as, but not limited to, a software product (e.g., a software program), a module within a software product, and/or any other software component (e.g. an enterprise java bean, a servlet, etc.) as may serve a particular application. As used herein, an "originating software application" is one that generates a message to be sent to another software application (referred to herein as a "recipient software application").

A "message" generated by a software application may include any data that may be read or otherwise processed by a message broker subsystem and/or a recipient software application. A message may be transmitted in encrypted form or as cleartext (i.e., non-encrypted form).

A "fault state" refers to a condition or state wherein a recipient software application is unable to receive a message from a message broker subsystem. A recipient software application may be in a fault state for any of a number of different reasons. For example, a recipient software application may include one or more glitches, bugs, or other problems that cause the recipient software application to be in a fault state. Additionally or alternatively, a recipient software application may be in a fault state while stuck in a database lookup or otherwise overloaded. Additionally or alternatively, a fault state may be caused by a resource drain on a computing device that is executing the recipient software application and/or a disabled, delayed, or otherwise faulty network connection between the recipient software application and the message broker subsystem. A fault state of a recipient software application may be temporary (e.g., only a few seconds) or more permanent (e.g., until fixed by a software developer).

FIG. 1 illustrates an exemplary broker-based messaging system 100 (or simply "system 100"). As shown in FIG. 1, system 100 may include a software application subsystem 102, a message broker subsystem 104, and a global directory service subsystem 106 configured to communicate with one another. Software application subsystem 102 may be configured to maintain and/or execute a plurality of software applications. Message broker subsystem 104 may be configured to function as message-oriented middleware and facilitate delivery of one or more messages generated by one or more originating software applications to one or more recipient software applications. Global directory service subsystem 106 may be configured to maintain registration data associated with the software applications and message broker subsystem 104. As will be described in more detail below, system 100 may facilitate fault surveillance of a recipient software application and provide for automatic fail-over processing of one or more messages intended for the recipient software application if the recipient software application is in a fault state.

System 100, including software application subsystem 102, message broker subsystem 104, and global directory service subsystem 106, may include any computer hardware and/or computer-implemented instructions (e.g., software), or combinations of computer-implemented instructions and hardware, configured to perform one or more of the processes described herein. For example, system 100, including software application subsystem 102, message broker subsystem 104, and global directory service subsystem 106, may include computer hardware (e.g., one or more computing devices) configured to perform one or more of the processes described herein. In some examples, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Software application subsystem 102, message broker subsystem 104, and global directory service subsystem 106 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols.

In some examples, software application subsystem 102, message broker subsystem 104, and global directory service subsystem 106 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between software application subsystem 102, message broker subsystem 104, and global directory service subsystem 106.

Figure 2:
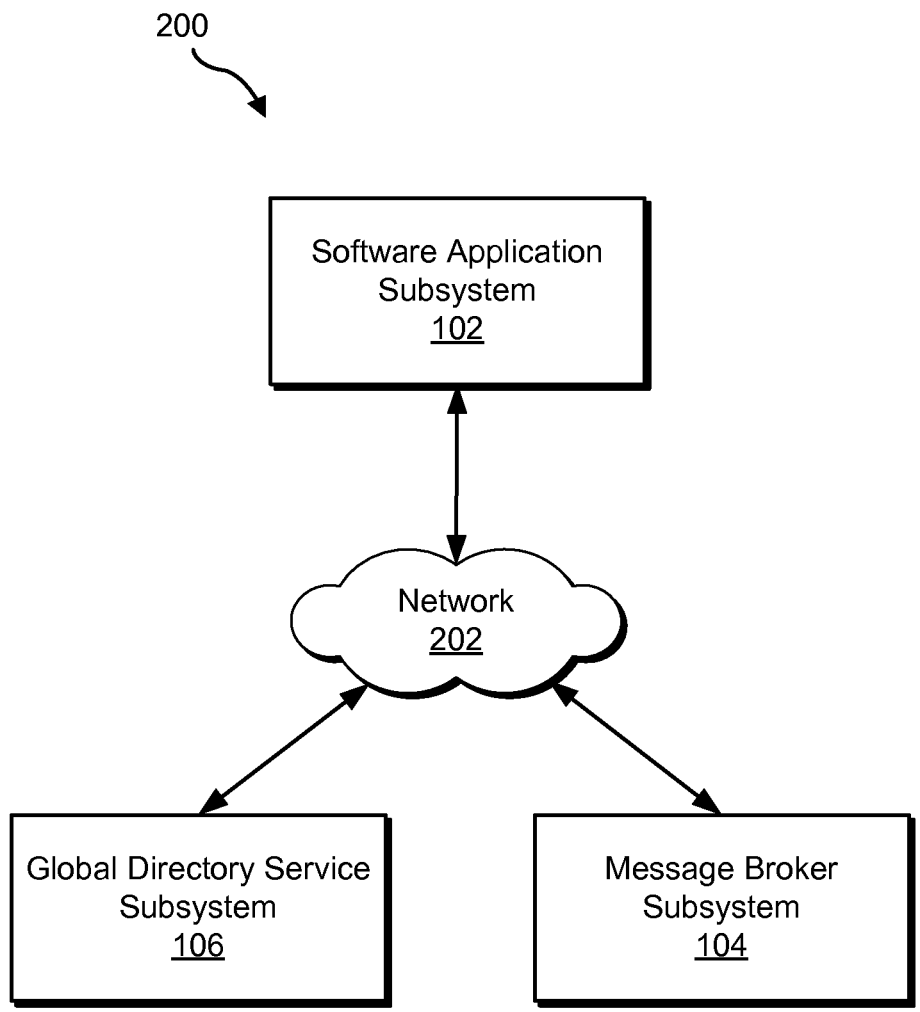
FIG. 2 shows an exemplary implementation of the system of FIG. 1 according to principles disclosed herein.

FIG. 2 shows an exemplary implementation 200 of system 100 wherein software application subsystem 102, message broker subsystem 104, and global directory service subsystem 106 are communicatively coupled via a network 202. Network 202 may include one or more networks, including, but not limited to, any of the networks listed above. Communications between software application subsystem 102, message broker subsystem 104, and global directory service subsystem 106 may be transported using any one of above-listed networks, or any combination or sub-combination of the above-listed networks. In some examples, software application subsystem 102, message broker subsystem 104, and/or global directory service subsystem 106 may be implemented at least in part on one or more servers or other network-enabled devices.

Figure 3:
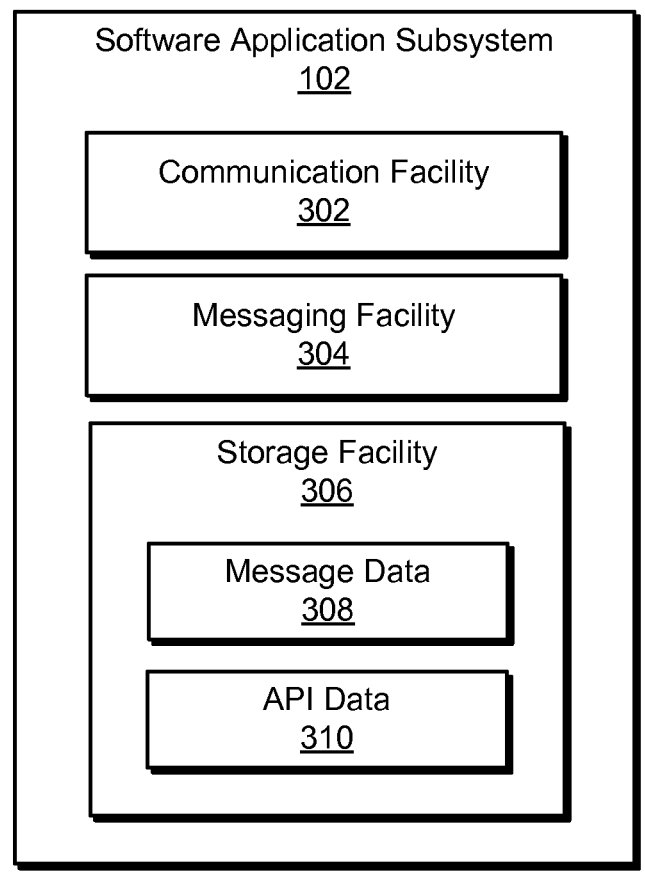
FIG. 3 illustrates exemplary components of a software application subsystem according to principles disclosed herein.

FIG. 3 illustrates exemplary components of software application subsystem 102. As shown in FIG. 3, software application subsystem 102 may include a communication facility 302, a messaging facility 304, and a storage facility 306, which may be in communication with one another using any suitable communication technologies. It will be recognized that although facilities 302-306 are shown to be separate facilities in FIG. 3, any of those facilities may be combined into a single facility as may serve a particular application.

Communication facility 302 may be configured to facilitate communication between software application subsystem 102 and message broker subsystem 104. For example, communication facility 302 may be configured to establish and/or assist in establishing one or more connections between software application subsystem 102 and message broker subsystem 104 over which one or more messages may be transmitted from software application subsystem 102 to message broker subsystem 104 and/or from message broker subsystem 104 to software application subsystem 102. The one or more connections established between software application subsystem 102 and message broker subsystem 104 may include one or more secure connections and/or one or more non-secure connection. An exemplary secure connection includes, but is not limited to, a secure sockets layer ("SSL") connection. An exemplary non-secure connection includes, but is not limited to, a non-SSL connection.

Communication facility 302 may additionally or alternatively be configured to facilitate communication between software application subsystem 102 and global directory service subsystem 106. For example, communication facility 302 may be configured to transmit data specifying one or more alternative recipient software applications for fail-over processing and/or any other data as may serve a particular application.

Messaging facility 304 may be configured to process a message generated by an originating software application and/or a message received by a recipient software application. Exemplary, but not exclusive, processing of a message that may be performed by messaging facility 304 includes encrypting a message, decrypting a message, preparing a message for transmission to a recipient software application via message broker subsystem 104, processing of a message received from message broker subsystem 104, etc.

Storage facility 306 may be configured to maintain message data 308 and application programming interface ("API") data 310. It will be recognized that storage facility 306 may maintain additional or alternative data as may serve a particular application.

Message data 308 may include data representative of one or more messages generated and/or received by a software application. Message data 308 may additionally include delivery instructions corresponding to one or more messages. For example, message data 308 may include a name or identification number of an intended recipient software application and/or computing device that executes the recipient software application.

API data 310 is representative of one or more APIs configured to facilitate integration of one or more software applications executed by software application subsystem 102 with message broker subsystem 104 and/or global directory service subsystem 106. For example, one or more APIs may interface with one or more software applications executed by application subsystem 102 to facilitate encryption of messages generated by the one or more software applications, communication with message broker subsystem 104 and/or global directory service subsystem 106, and/or any other feature as may serve a particular application.

Figure 4:
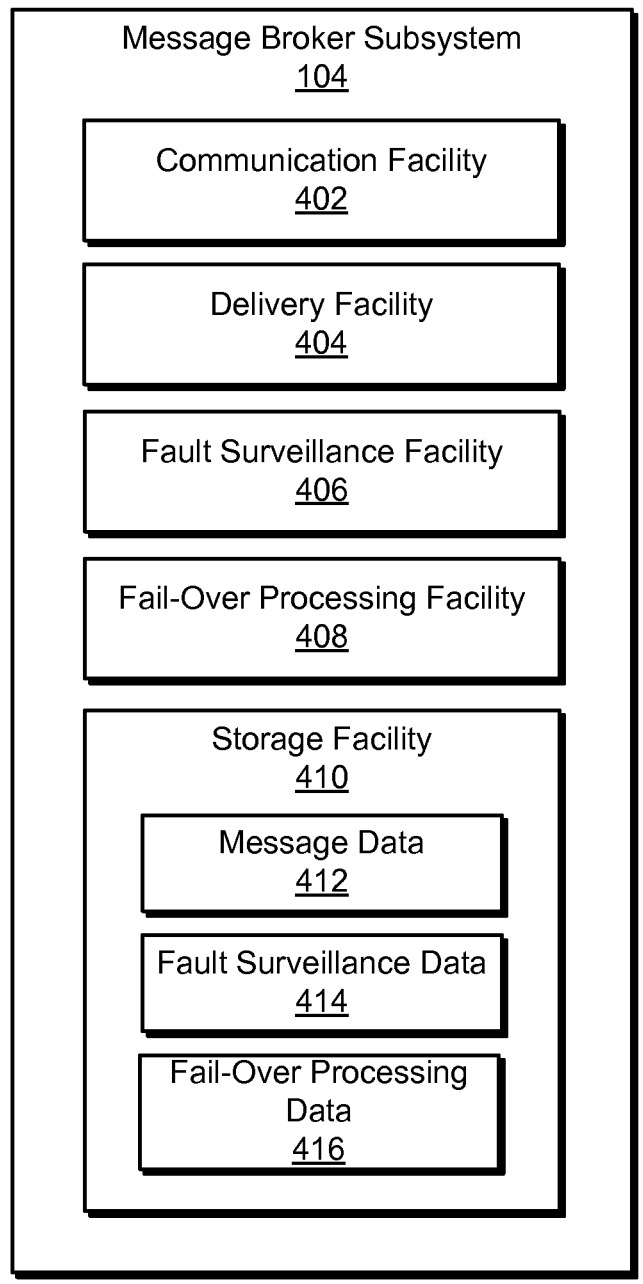
FIG. 4 illustrates exemplary components of a message broker subsystem according to principles disclosed herein.

FIG. 4 illustrates exemplary components of message broker subsystem 104. As shown in FIG. 4, message broker subsystem 104 may include a communication facility 402, a delivery facility 404, a fault surveillance facility 406, a fail-over processing facility 408, and a storage facility 410, which may be in communication with one another using any suitable communication technologies. It will be recognized that although facilities 402-410 are shown to be separate facilities in FIG. 4, any of those facilities may be combined into a single facility as may serve a particular application.

Communication facility 402 may be configured to facilitate communication between message broker subsystem 104 and software application subsystem 102. For example, communication facility 402 may be configured to establish and/or assist in establishing one or more connections between message broker subsystem 104 and software application subsystem 102 over which one or more messages may be transmitted from software application subsystem 102 to message broker subsystem 104 and/or from message broker subsystem 104 to software application subsystem 102.

Communication facility 402 may additionally or alternatively be configured to facilitate communication between message broker subsystem 104 and global directory service subsystem 106. For example, communication facility 402 may be configured to transmit data representative of a request for fail-over processing data from global directory service subsystem 106 and/or any other data as may serve a particular application.

Delivery facility 404 may be configured to deliver one or more messages received from one or more originating software applications to one or more recipient software applications in accordance with delivery instructions included within the message(s). To this end, delivery facility 404 may be configured to utilize one or more connections established by communication facility 402.

In some instances, however, a recipient software application may be in a fault state when delivery facility 404 attempts to deliver one or more messages thereto. For example, the connection over which message broker subsystem 104 attempts to deliver the one or more messages to the recipient software application may be faulty. Hence, as will be described in more detail below, delivery facility 404 may attempt to deliver each message to the recipient software application during a corresponding and predetermined message interval (e.g., ten seconds). If a particular message cannot be delivered during its corresponding message interval, delivery facility 404 may cease attempting to deliver the message and the message may be designated for fail-over processing by fail-over processing facility 408, as will be described in more detail below.

Delivery facility 404 may continue this process of attempting to deliver messages during message intervals to the recipient software application for a predetermined amount of time, referred to herein as a "fault interval." The fault interval may be user configurable and may include any period of time (e.g., five minutes) equal to or greater than a message interval as may serve a particular application. As will be described in more detail below, if delivery facility 404 fails to deliver any message during the fault interval, the recipient software application may be deemed to be in a fault state.

Fault surveillance facility 406 may be configured to monitor whether delivery facility 404 is able to successfully deliver messages to a recipient software application. For example, fault surveillance facility 406 may monitor attempts made by delivery facility 404 to deliver one or more messages to a recipient software application during a predetermined fault interval. If delivery facility 404 fails to deliver the one or more messages during the fault interval, fault surveillance facility 406 may determine that a recipient software application is in a fault state.

Fault surveillance facility 406 may direct delivery facility 404 to cease attempting to deliver one or more queued messages and/or any subsequently received messages intended for a software application deemed by fault surveillance facility 406 to be in a fault state. In some examples, as will be described in more detail below, delivery facility 404 may continue to attempt to deliver one of the messages to the recipient software application after fault surveillance facility 406 determines the recipient software application to be in a fault state in order for fault surveillance facility 406 to continue to monitor an operational state of the recipient software application (i.e., whether the recipient software application comes out of the fault state).

Fail-over processing facility 408 may be configured to perform a fail-over process on any message that cannot be delivered within its corresponding message interval. For example, if a message having a message interval of ten seconds cannot be delivered by delivery facility 402 to a recipient software application, fail-over processing facility 408 may perform a fail-over process on the message.

Additionally or alternatively, fail-over processing facility 408 may be configured to automatically perform a fail-over process on one or more messages intended for a recipient software application in response to a determination by fault surveillance facility 406 that the recipient software application is in a fault state. For example, fail-over processing facility 408 may direct delivery facility 404 to automatically deliver the one or more messages to an alternative recipient software application specified by global directory service subsystem 106 without first attempting to deliver the one or more messages to the recipient software application during corresponding message intervals. To this end, as will be described in more detail below, fail-over processing facility 408 may query global directory service subsystem 106 to identify the alternative recipient software application prior to directing delivery facility 404 to deliver the one or more messages to the alternative recipient software application. Alternatively, if no alternative recipient software application is specified by global directory service subsystem 106, fail-over processing facility 408 may return the one or more messages to one or more originating software applications. Examples of such fail-over processing will be described in more detail below.

In some examples, the fail-over processing may be performed on one or more messages received by message broker subsystem 104 and queued for delivery to a recipient software application before fault surveillance facility 406 determines that the recipient software application is in a fault state. Additionally or alternatively, the fail-over processing may be performed on one or more messages received by message broker subsystem 104 after fault surveillance facility 406 determines that the recipient software application is in a fault state.

As will be described in more detail below, fail-over processing facility 408 may automatically perform the fail-over processing on one or more messages without delivery facility 404 attempting to deliver the one or more messages after the recipient software application has been determined to be in a fault state. In this manner, time and resources associated with attempting to deliver the one or more messages to the recipient software application may be minimized or avoided.

As mentioned, delivery facility 404 may continue to attempt to deliver a message (e.g., a message selected from the one or more messages attempted to be delivered by delivery facility 402) to the recipient software application after fault surveillance facility 406 determines the recipient software application to be in a fault state so that fault surveillance facility 406 may continue to monitor an operational state of the recipient software application (i.e., whether the recipient software application comes out of the fault state). In some examples, delivery facility 404 may be configured to attempt to deliver the selected message during a predetermined period of time (referred to herein as a "defunct interval") immediately following the fault interval. If delivery facility 404 fails to deliver the selected message during the predetermined time, fault surveillance facility 406 may determine that the recipient software application is in a "defunct state." A defunct state is similar to a fault state in that the recipient software application is unable to receive a message from message broker subsystem 104. However, a defunct state implies that the recipient software application may be in a fault state for a relatively long period of time and that it is not worth attempting to deliver messages thereto until the software application reestablishes a connection with message broker subsystem 104. Hence, in some examples, fault surveillance facility 406 may be configured to direct communication facility 402 to terminate a connection between message broker subsystem 104 and the recipient software application in response to a determination made by fault surveillance facility 406 that the recipient software application is in a defunct state. In response to the connection termination, fail-over processing facility 408 may perform a fail-over process on the selected message.

In some examples, a recipient software application deemed to be in a defunct state may be fixed or otherwise come out of the defunct state. The recipient software application may then transmit a request to message broker subsystem 106 to reestablish the terminated connection between message broker subsystem 106 and the recipient software application. Communication facility 402 may be configured to receive the request initiated by the recipient software application and reestablish the connection. In response, fail-over processing facility 408 may cease the automatic performing of the fail-over process and direct delivery facility 404 to resume delivering messages to the recipient software application.

Storage facility 410 may be configured to maintain message data 412 representative of one or more messages to be delivered to a recipient software application, fault surveillance data 414 representative of data utilized by fault surveillance facility 406 (e.g., user-configurable data representative of a fault interval and/or a defunct interval), and fail-over processing data 416 representative of data utilized by fail-over processing facility 408 (e.g., data representative of one or more alternative recipient software applications). Storage facility 410 may maintain additional or alternative data as may serve a particular application.

Figure 5:
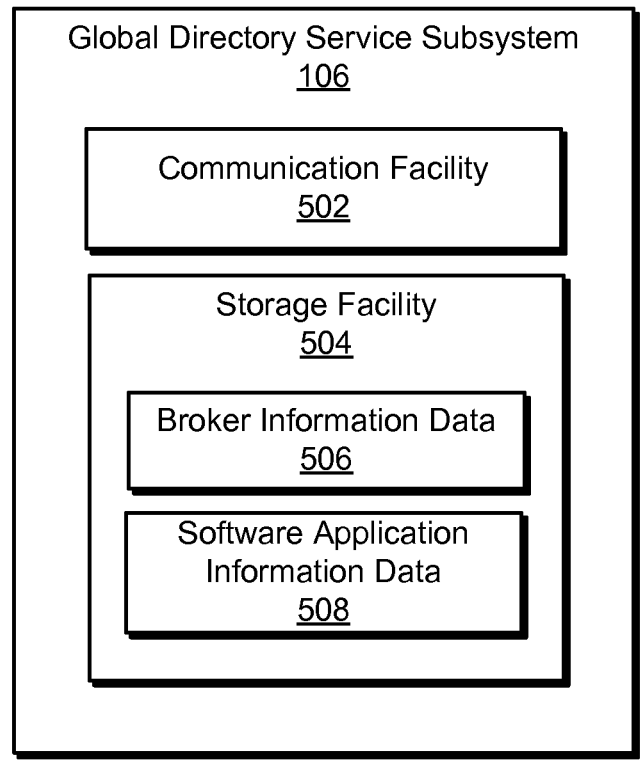
FIG. 5 illustrates exemplary components of global directory service subsystem according to principles disclosed herein.

FIG. 5 illustrates exemplary components of global directory service subsystem 106. As shown in FIG. 5, global directory service subsystem 106 may include a communication facility 502 and a storage facility 504, which may be in communication with one another using any suitable communication technologies. As will be described in more detail below, software application subsystem 102 and message broker subsystem 104 may register with global directory service subsystem 106 so that message broker subsystem 104 may be able to determine how and where to deliver messages to one or more recipient software applications.

Communication facility 502 may be configured to facilitate communication between global directory service subsystem 106 and software application subsystem 102. Communication facility 502 may be further configured to facilitate communication between global directory service subsystem 106 and message broker subsystem 104.

Storage facility 504 may be configured to maintain broker information data 506, software application information data 508, and/or any other data as may serve a particular application.

Broker information data 506 may include information descriptive of or otherwise corresponding to message broker subsystem 104. For example, broker information data 506 may include a list of broker names and corresponding IP addresses and location port numbers. Broker information data 506 may be registered dynamically and/or statically as may serve a particular application.

Software application information data 508 may include information descriptive of or otherwise corresponding to one or more software applications. For example, software application information data 508 may include a list of software application names, associated broker names, and one or more names of alternative software applications for fail-over processing. Software application information data 508 may be registered dynamically and/or statically as may serve a particular application. For example, software application information data 508 may be periodically updated (e.g., nightly).

As mentioned, software application subsystem 102, message broker subsystem 104, and global directory service subsystem 106 may each be implemented on one or more computing devices. For example, software application subsystem 102 may be implemented on a first computing device configured to execute an originating software application and a second computing device configured to execute a recipient software application. Alternatively, software application subsystem 102 may be implemented on a single computing device configured to execute both the originating and recipient software applications.

In some examples, software application subsystem 102, message broker subsystem 104, and global directory service subsystem 106 are implemented on distinct computing devices. Alternatively, subsystems 102-106 may be implemented on the same computing device. Any other implementation of subsystems 102-106 may be realized in accordance with the systems and methods described herein.

Figure 6:
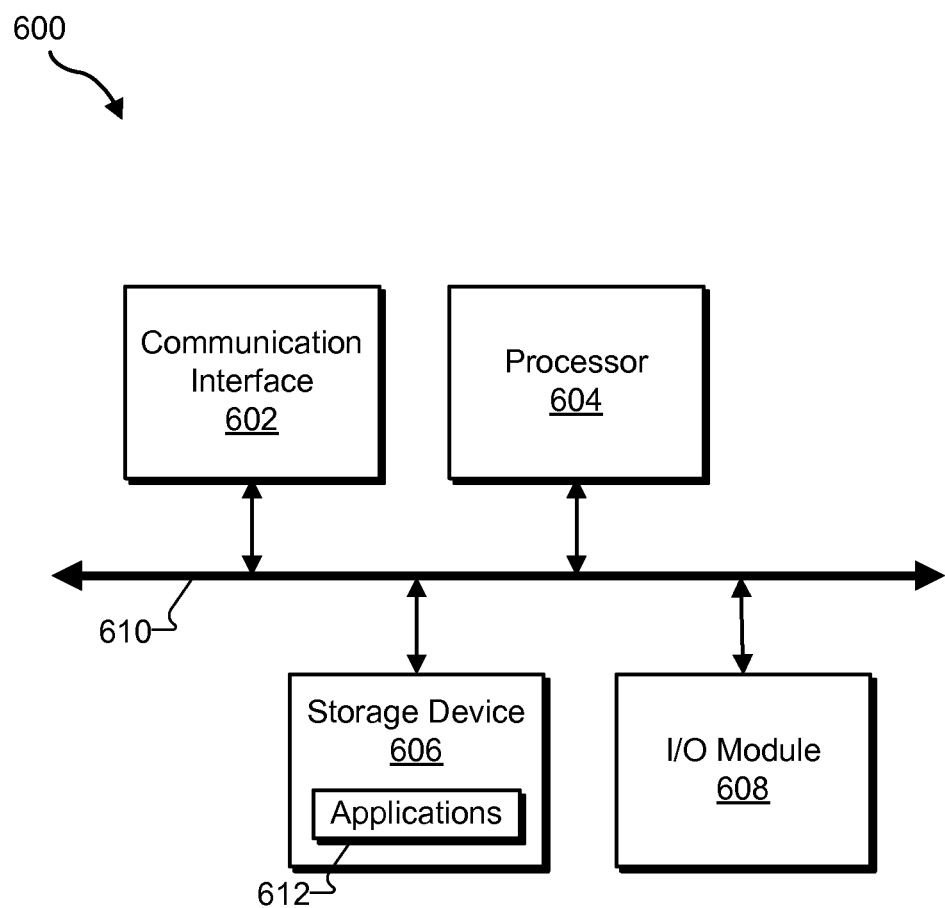
FIG. 6 illustrates an exemplary computing device according to principles disclosed herein.

FIG. 6 illustrates an exemplary computing device 600 that may have any combination of software application subsystem 102, message broker subsystem 104, and/or global directory service subsystem 106 implemented thereon. Computing device 600 may include a client device, a server, a personal computer, a set-top box, a media content processing device, a communications device, an audio file player device, a mobile device (e.g., a mobile phone device), a handheld device, a phone device, a personal-digital assistant device, a gaming device, a television device, and/or any other computing device configured to perform one or more of the processes and/or operations described herein.

As shown, computing device 600 may include a communication interface 602, a processor 604, a storage device 606, and an input/output ("I/O") module 608 communicatively connected via a communication infrastructure 610. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. In particular, communication interface 602 may be configured to transmit and/or receive one or more messages, encryption configuration data, communication signals, and/or other data. Examples of communication interface 602 include, without limitation, a wired network interface (such as a network interface card), a wireless network interface (such as a wireless network interface card), a modem, and any other suitable interface. In at least one embodiment, communication interface 602 may provide a direct connection between two or more of subsystems 102-106 via a direct link to a network, such as the Internet. Communication interface 602 may additionally or alternatively provide such a connection through, for example, a local area network (such as an Ethernet network), a personal area network, a telephone or cable network, a cellular telephone connection, a satellite data connection, a dedicated URL, or any other suitable connection. Communication interface 602 may be configured to interface with any suitable communication media, protocols, and formats, including any of those mentioned above.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium. As an example, processor 604 may be configured to process data representative of a message generated by a software application, including encrypting, decrypting, and/or parsing the data.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 606. For example, data representative of one or more executable applications 612 (which may include, but are not limited to, one or more of the software applications described herein) configured to direct processor 604 to perform any of the operations described herein may be stored within storage device 606. In some examples, data may be arranged in one or more databases residing within storage device 606.

I/O module 608 may be configured to receive user input and provide user output and may include any hardware, firmware, software, or combination thereof supportive of input and output capabilities. For example, I/O module 608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces ("GUIs"), GUI views, media content views, and/or any other view as may serve a particular application.

In some examples, any of the facilities described herein may be implemented by or within one or more components of computing device 600. For example, one or more applications 612 residing within storage device 606 may be configured to direct processor 604 to perform one or more processes or functions associated with communication facility 302, messaging facility 304, communication facility 402, delivery facility 404, fault surveillance facility 406, fail-over processing facility 408, and/or communication facility 502. Likewise, storage facility 306, storage facility 410, and/or storage facility 504 may be implemented by or within storage device 606.

Figure 7:
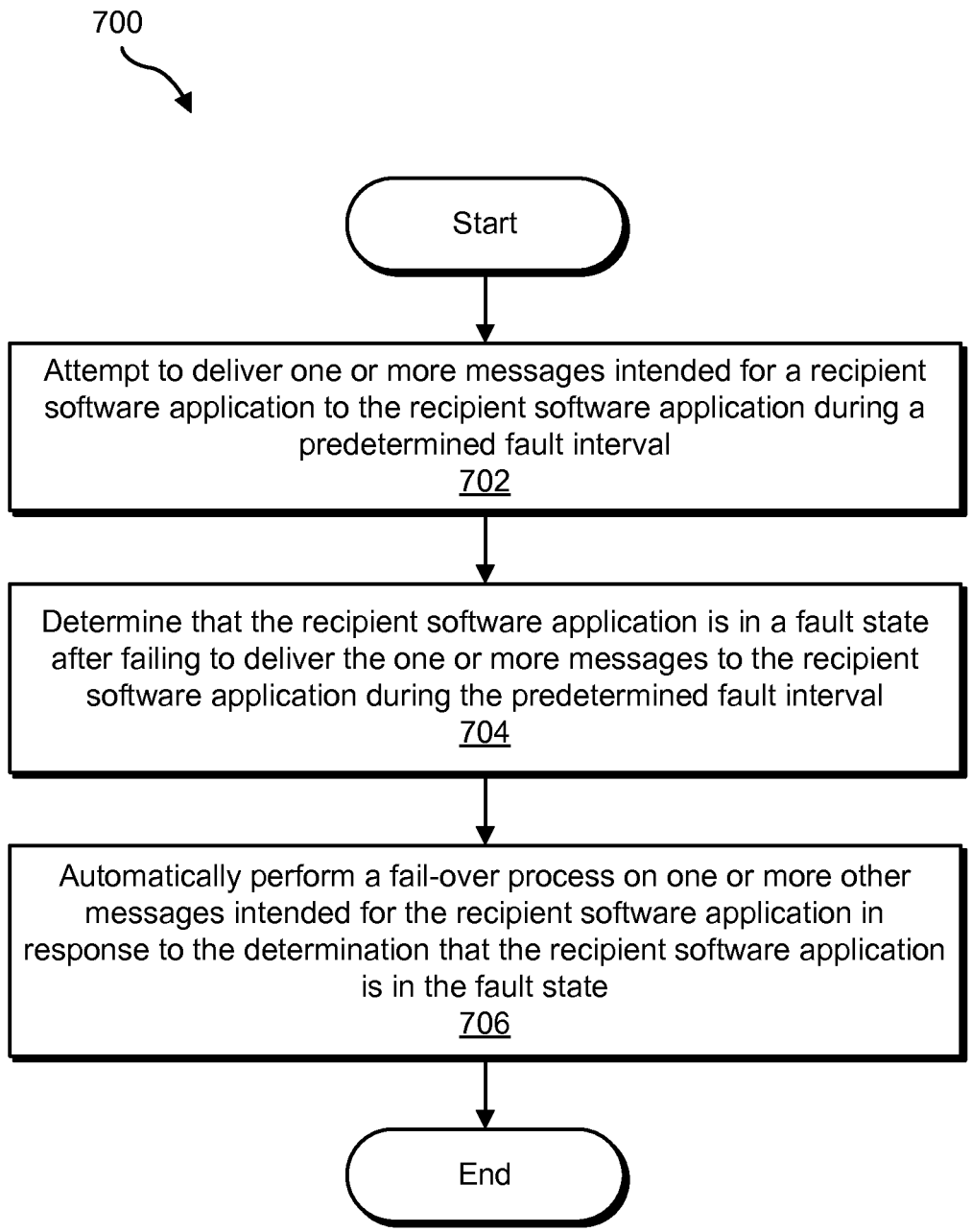
FIG. 7 illustrates an exemplary broker-based messaging method according to principles disclosed herein.

FIG. 7 illustrates an exemplary broker-based messaging method 700 that includes fault surveillance and automatic fail-over processing. While FIG. 7 illustrates exemplary steps according to one embodiment, other embodiments may omit, add to, reorder, and/or modify any of the steps shown in FIG. 7. One or more steps of method 700 may be performed by message broker subsystem 104 and/or any facility, component, or device thereof.

In step 702, a message broker subsystem attempts to deliver one or more messages intended for a recipient software application to the recipient software application during a predetermined fault interval. The one or more messages may be generated by an originating software application and may be attempted to be delivered by the message broker subsystem in any of the ways described herein. The fault interval may be user configurable and may be of any suitable length.

In step 704, the message broker subsystem determines that the recipient software application is in a fault state after failing to deliver the one or more messages to the recipient software application during the predetermined fault interval. The message broker subsystem may perform the determination in any of the ways described herein.

In step 706, the message broker subsystem automatically performs a fail-over process on one or more other messages intended for the recipient software application in response to the determination that the recipient software application is in the fault state. The fail-over process may include any of the fail-over process described herein. For example, the message broker subsystem may automatically deliver the one or more other messages to an alternative recipient software application specified by a global directory service subsystem. Alternatively, if no alternative recipient software application is specified by the global directory service subsystem, the message broker subsystem may return the one or more other messages to one or more originating software applications.

Figure 9:
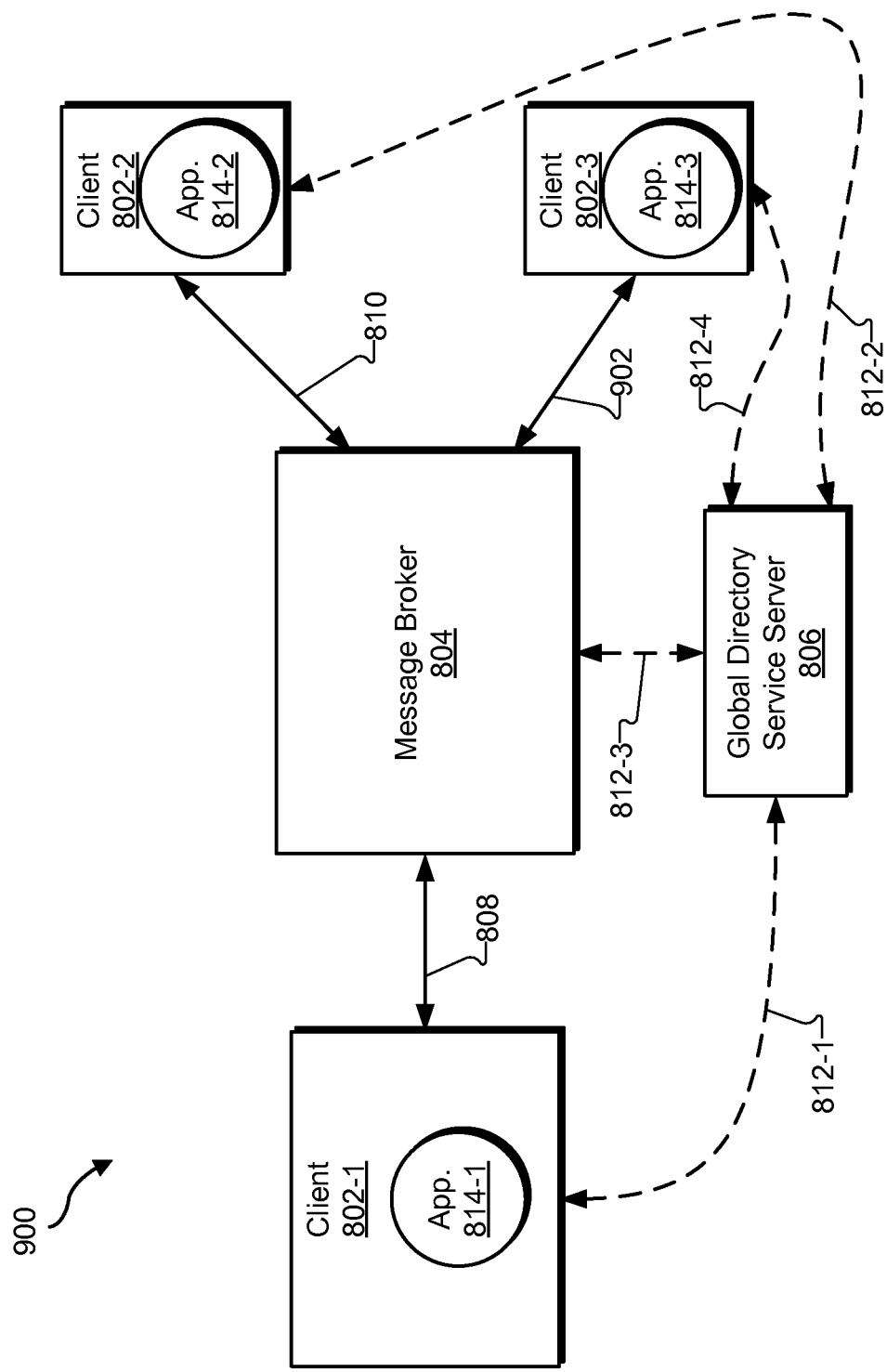
FIG. 9 illustrates another exemplary implementation of the system of FIG. 1 according to principles disclosed herein.
Figure 10:
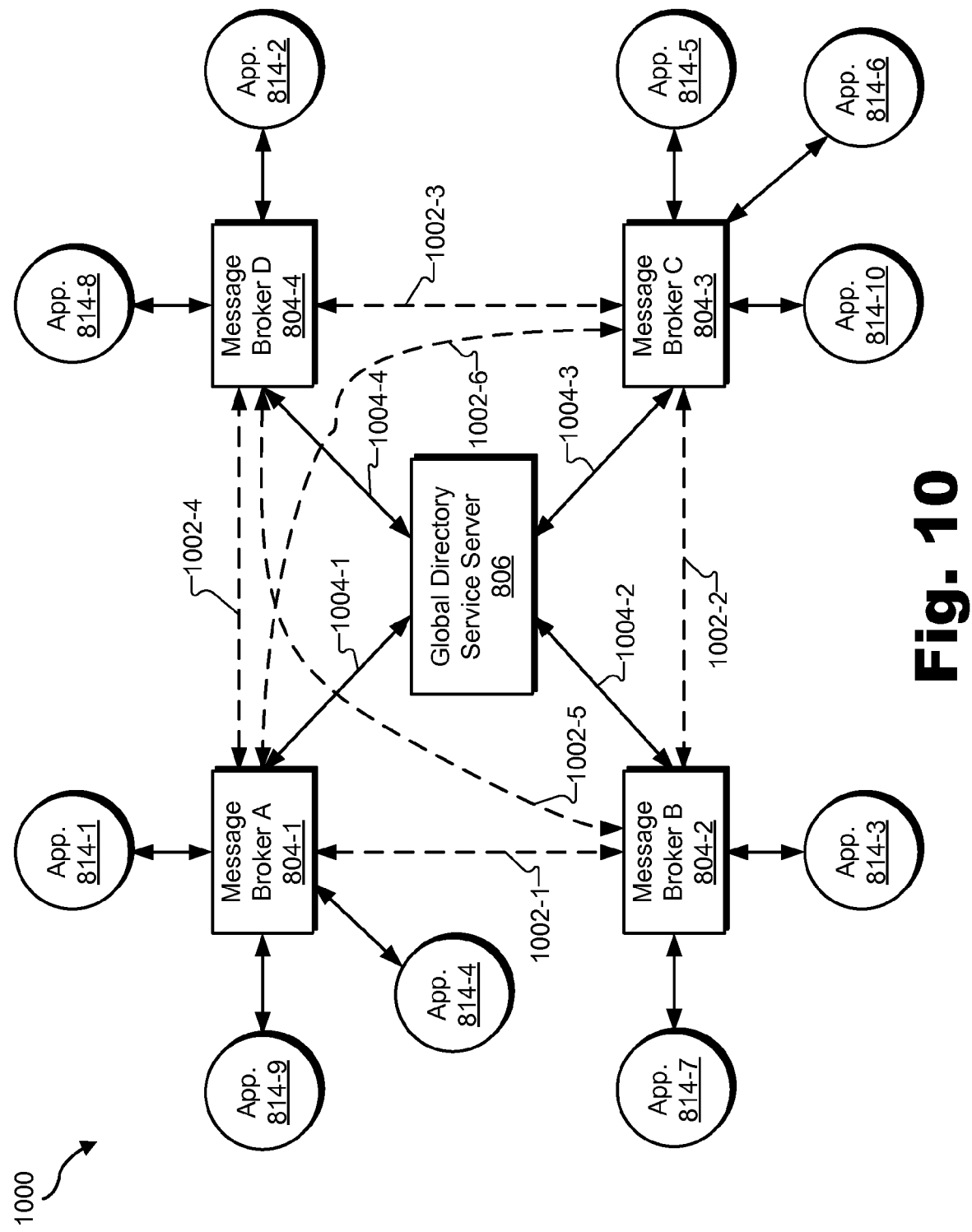
FIG. 10 illustrates another exemplary implementation of the system of FIG. 1 according to principles disclosed herein.

Specific implementations and examples of the systems and methods described herein will now be described in connection with FIGS. 8-10. It will be recognized that the implementations and examples described in connection with FIGS. 8-10 are merely illustrative of the many possible implementations and examples of the systems and methods described herein.

Figure 8:
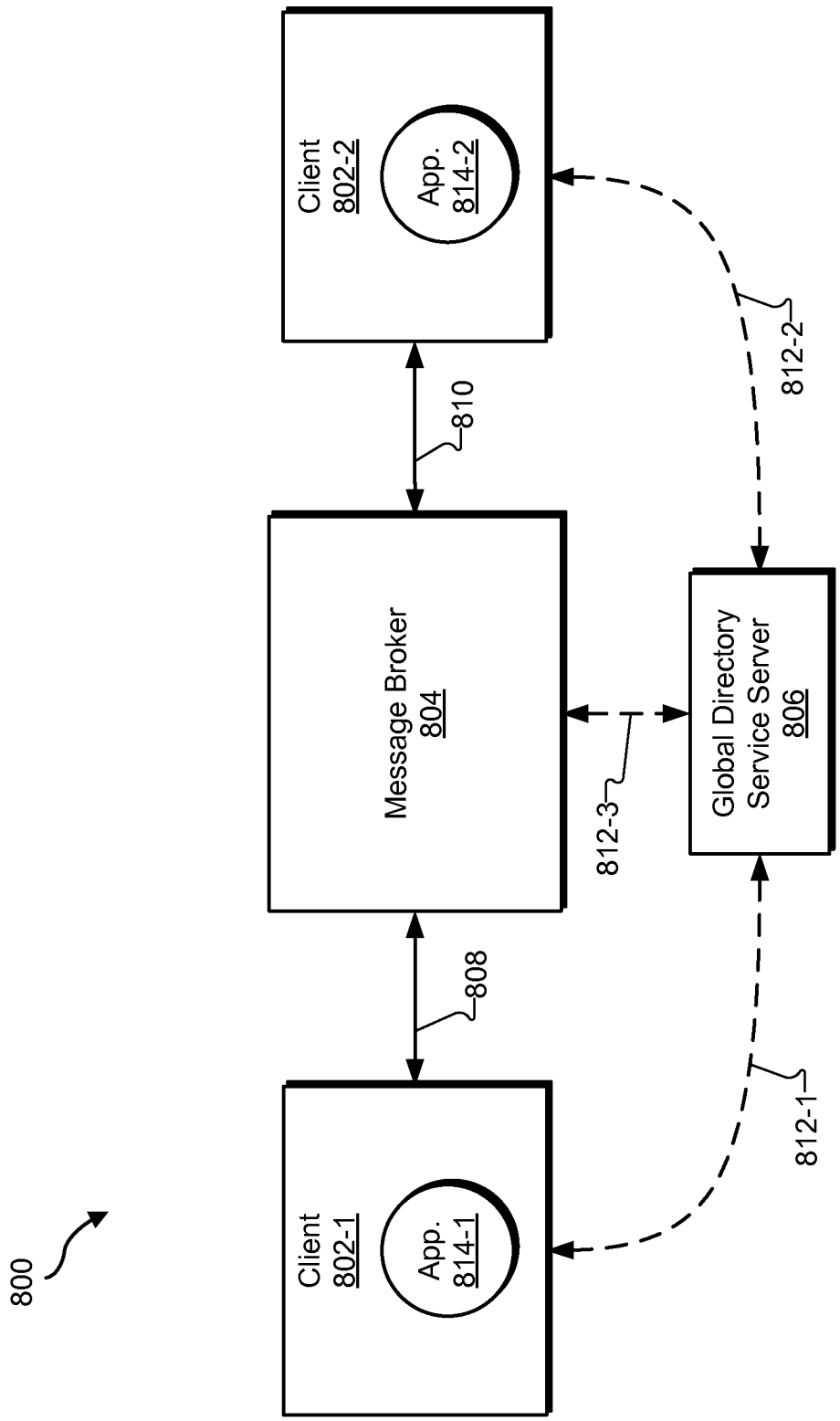
FIG. 8 illustrates another exemplary implementation of the system of FIG. 1 according to principles disclosed herein.

FIG. 8 illustrates an exemplary implementation 800 of system 100. As shown in FIG. 8, clients 802-1 and 802-2 (collectively referred to herein as "clients 802"), a message broker 804, and a global directory service server 806 may be communicatively coupled one to another. Software application subsystem 102 may be implemented on clients 802, message broker subsystem 104 may be implemented on message broker 804, and global directory service subsystem 106 may be implemented on global directory service server 806. Client 802-1 may be communicatively coupled to message broker 804 by way of a connection 808, and client 802-2 may be communicatively coupled to message broker 804 by way of a connection 810. Global directory services server 806 may be communicatively coupled to client 802-1, client 802-2, and message broker 804 by way of connections 812-1, 812-2, and 812-3, respectively.

As shown in FIG. 8, client 802-1 may be configured to execute a software application 814-1. Software application 814-1 may reside within client 802-1, as depicted in FIG. 8, or may be located within any other subsystem or device. Software application 814-1 may be configured to generate a message that is to be transmitted to another software application 814-2 executed by and/or residing within client 802-2. Hence, software application 814-1 may be referred to as an originating software application and software application 814-2 may be referred to as a recipient software application.

Configuring both software applications 814-1 and 814-2 (collectively "software applications 814") to interface directly one with another may be costly, difficult, cumbersome, and sometimes impossible. Hence, messages may be transmitted between software applications 814 via message broker 804, which is configured to interface with both software applications 814. To this end, client 802-1 may be configured to selectively establish connection 808 with the message broker 804. Message broker 804 may in turn selectively establish connection 810 with client 802-2. A message generated by originating software application 814-1 may be transmitted to message broker 804 by way of connection 808. Message broker 804 may deliver the message to recipient software application 814-2 by way of connection 810.

If message broker 804 has already determined that recipient software application 814-2 is in a fault state (i.e., unable to receive the message from message broker 804), message broker 804 may automatically perform fail-over processing on the message and/or one or more other messages intended for recipient software application 814-2.

To this end, message broker 814 may query global directory service server 806 to determine the type of fail-over processing to be performed on messages intended for recipient software application 814-2. Global directory service server 806 may maintain data representative of a fail-over process to be performed on messages that cannot be delivered to recipient software application 814-2. In the example of FIG. 8, there are no other software applications connected to message broker 804, so global directory service server 806 may indicate that message broker 804 is to simply return messages to originating software application 814-1 while the recipient software application is in a fault state.

In some examples, message broker 804 may locally cache the fail-over processing data obtained from global directory service server 806 so that message broker 804 may avoid querying global directory service server 806 each time a message intended for recipient software application 814-2 is processed by message broker 804. Message broker 804 may be configured to periodically re-query global directory service server 806 for the fail-over processing data in the event that the fail-over processing data changes.

As described previously, message broker 804 may hold a message (i.e., not perform fail-over processing on the message) and continue to attempt to deliver the message to recipient software application 814-2 after determining that recipient software application is in a fault state. If at any time message broker 804 is successful in delivering the message to recipient software application 814-2, message broker 804 may immediately cease performing the fail-over processing on messages intended for recipient software application 814-2 and resume delivering the messages to recipient software application 814-2.

FIG. 9 illustrates another exemplary implementation 900 of system 100. As shown in FIG. 9, implementation 900 is similar to implementation 800 shown in FIG. 8, except that implementation 900 includes an additional client 802-3 communicatively coupled to message broker 804 by way of a connection 902 and to global directory service server 806 by way of a connection 812-4. Client 802-3 is configured to execute a software application 814-3.

In some examples, software application 814-3 may be specified by global directory service server 806 as an alternative recipient software application corresponding to recipient software application 814-2. Hence, if recipient software application 814-2 is in a fault state, message broker 804 may automatically deliver messages intended for recipient software application 814-2 to software application 814-3.

FIG. 10 illustrates another exemplary implementation 1000 of system 100 wherein message broker subsystem 104 includes multiple message brokers 804 (e.g., message brokers 804-1 through 804-4) configured to communicate one with another by way of connections 1002 (e.g., connections 1002-1 through 1002-6). Each message broker 804 may also be configured to communicate with global directory service server 806 by way of connections 1004 (e.g., connections 1004-1 through 1004-4). Each message broker 804 may have a unique name for identification purposes within global directory service server 806. For example, message broker 804-1 is named "message broker A", message broker 804-2 is named "message broker B", message broker 804-3 is named "message broker C", and message broker 804-4 is named "message broker D" in FIG. 10.

Each message broker 804 may be associated with one or more software applications 814 (e.g., software applications 814-1 through 814-10). For example, message broker 804-1 is associated with software applications 814-1, 814-4, and 814-9 in FIG. 10. Message brokers 804-2 through 804-4 may be associated with the other software applications 814, as illustrated in FIG. 10. Each message broker 804 is configured to receive messages from and/or deliver messages to its associated software applications 814.

Though not illustrated specifically in FIG. 10, the software applications 814 shown in FIG. 10 may each reside within and/or be executed by one or more clients. For example, software application 814-1 may be executed by a first client, software application 814-4 may be executed by a second client, and software application 814-9 may be executed by a third client. In an alternative configuration, all of software applications 814-1, 814-4, and 814-9 may be executed by a single client. One or more other clients may be configured to execute the other software applications 814 shown in FIG. 10.

Global directory service server 806 may be configured to maintain broker information data associated with the message brokers 804 shown in FIG. 10. To illustrate, FIG. 11 shows an exemplary broker information table 1100 comprising broker information data that may be maintained by global directory service server 806. The broker information data may be maintained in the form of a look up table, for example.

As shown in FIG. 11, broker information table 1100 may include a list of broker names, location IP addresses, and location port numbers associated with each message broker 804. The information included within broker information table 1100 may be accessed by message brokers 804 and/or software applications 814 to determine appropriate delivery instructions for messages to be transmitted from one software application 814 to another.

Global directory service server 806 may be further configured to maintain software application information data associated with the software applications 814 shown in FIG. 10. To illustrate, FIG. 12 shows an exemplary software application information table 1200 comprising software application information data that may be maintained by global directory service server 806. The software application data may be maintained in the form of a look up table, for example.

As shown in FIG. 12, software application table 1200 may include a list of names of each of the software applications 814. For example, software application 814-1 may be named "application 1", software application 814-2 may be named "application 2", etc. Software application table 1200 may further include the name of a message broker 804 that is associated with each of the software applications 814. For example, software application information table 1200 shows that application 1 (i.e., software application 814-1) is associated with broker A (i.e., message broker 804-1), application 2 (i.e., software application 814-2) is associated with broker D (i.e., message broker 804-4), etc. Software application table 1200 may further include the names of one or more software applications that have been designated as alternative software applications for one or more of the software applications 814. For example, application 3 (i.e., software application 814-3) and application 6 (i.e., software application 814-6) are shown to be designated as alternative software applications for application 1 (i.e., software application 814-1).

The information included within software application information table 1200 may be used to determine the type of fail-over processing performed on a message intended for a software application that has been determined to be in a fault state. For example, a message intended for application 1 (i.e., software application 814-1) may be instead delivered to application 3 (i.e., software application 814-3) if software application 814-1 is in a fault state. If software application 814-3 is also in a fault state, the message may be delivered to application 6 (i.e., software application 814-6). If software applications 814-1, 814-3, and 814-6 are all in a fault state, the message may be returned to an originating software application.

Returning to FIG. 10, an example illustrating fail-over processing that may be performed on a message will now be given. Software application 814-8 may generate a message intended for software application 814-7. Software application 814-8 may transmit the message to message broker 804-4. Message broker 804-4 may process the delivery instructions included in the message to determine that the message is to be delivered to software application 814-7. Message broker 804-4 may then query global directory service server 806 to determine whether software application 814-7 is registered with global directory service server 806. Global directory service server 806 may inform message broker 804-4 that software application 814-7 is a registered software application and that it is associated with message broker 804-2. Global directory service server 806 may also provide message broker 804-4 with the location IP address and location port number of message broker 804-2. Using this information, message broker 804-4 establishes a connection (i.e., connection 1002-5) with message broker 804-2 (unless the connection has already been established). Message broker 804-4 may then transmit the message to message broker 804-2.

Message broker 804-2 may receive and attempt to deliver the message to software application 814-7. If message broker 804-2 fails to deliver the message within a predetermined message interval or fault interval, message broker 804-2 may determine that software application 814-7 is in a fault state. Message broker 804-2 may then return the message to message broker 804-4 indicating that software application 814-7 is in the fault state.

Message broker 804-4 may then query global directory service server 806 to determine that software application 814-5 has been designated as an alternative software application for software application 814-7. Alternatively, message broker 804-4 may have this fail-over processing information already cached. In this case, message broker 804-4 may proceed with fail-over processing on the message without first querying global directory service server 806.

Message broker 804-4 may query global directory service server 806 to determine whether software application 814-5 is registered with global directory service server 806. Global directory service server 806 may inform message broker 804-4 that software application 814-5 is a registered software application and that it is associated with message broker 804-3. Global directory service server 806 may also provide message broker 804-4 with the location IP address and location port number of message broker 804-3. Using this information, message broker 804-4 establishes a connection (i.e., connection 1002-3) with message broker 804-3 (unless the connection has already been established). Message broker 804-4 may then transmit the message to message broker 804-3.

Message broker 804-3 may receive and attempt to deliver the message to software application 814-5. If the delivery is successful, message broker 804-3 may notify message broker 804-4 accordingly. If message broker 804-3 fails to deliver the message within a predetermined message interval or fault interval, message broker 804-3 may determine that software application 814-5 is in a fault state. Message broker 804-3 may then return the message to message broker 804-4, which may return the message to originating software application 814-8 indicating that both software applications 814-7 and 814-5 are in a fault state.

Figure 13:
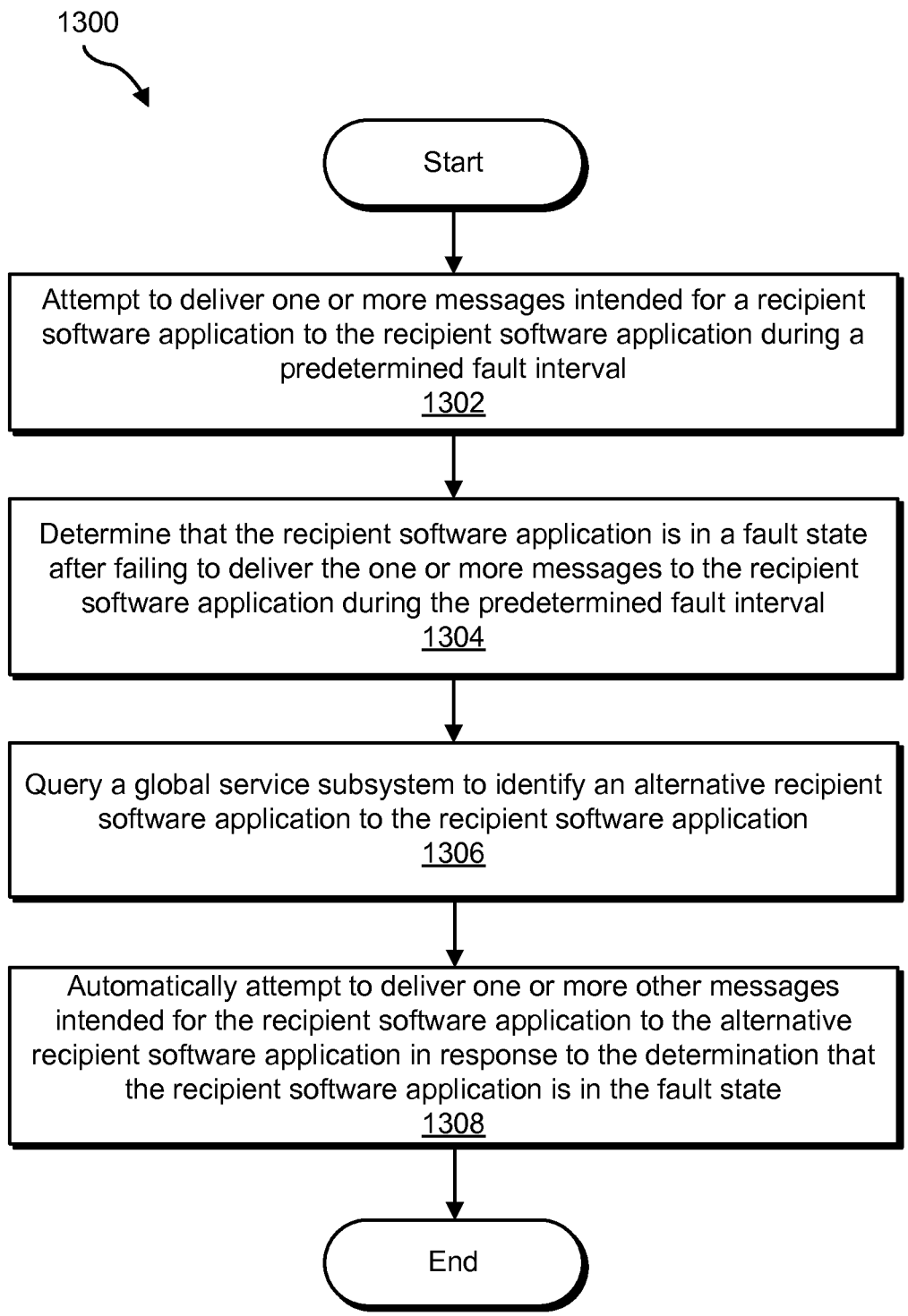
FIG. 13 illustrates another exemplary broker-based messaging method according to principles disclosed herein.

FIG. 13 illustrates another exemplary broker-based messaging method 1300 that includes fault surveillance and automatic fail-over processing. While FIG. 13 illustrates exemplary steps according to one embodiment, other embodiments may omit, add to, reorder, and/or modify any of the steps shown in FIG. 13. One or more steps of method 1300 may be performed by message broker subsystem 104 and/or any facility, component, or device thereof.

In step 1302, a message broker subsystem attempts to deliver one or more messages intended for a recipient software application to the recipient software application during a predetermined fault interval. The one or more messages may be generated by an originating software application and may be attempted to be delivered by the message broker subsystem in any of the ways described herein. The fault interval may be user configurable and may be of any suitable length.

In step 1304, the message broker subsystem determines that the recipient software application is in a fault state after failing to deliver the one or more messages to the recipient software application during the predetermined fault interval. The message broker subsystem may perform the determination in any of the ways described herein.

In step 1306, the message broker subsystem queries a global service subsystem to identify an alternative recipient software application to the recipient software application. A software application may be designated as an alternative recipient software application in any of the ways described herein.

In step 1308, the message broker subsystem automatically attempts to deliver one or more other messages intended for the recipient software application to the alternative recipient software application in response to the determination that the recipient software application is in the fault state. The message broker may attempt to deliver the one or more other message to the alternative recipient software application in any of the ways described herein.

As detailed above, the methods and systems described herein facilitate fault surveillance and automatic fail-over processing in broker-based messaging systems. As an example, an exemplary method includes attempting, by a message broker subsystem, to deliver one or more messages intended for a recipient software application to the recipient software application during a predetermined fault interval, determining, by the message broker subsystem, that the recipient software application is in a fault state after failing to deliver the one or more messages to the recipient software application during the predetermined fault interval, and automatically performing, by the message broker subsystem, a fail-over process on one or more other messages intended for the recipient software application in response to the determination that the recipient software application is in the fault state.

Another exemplary method includes attempting, by a message broker subsystem, to deliver one or more messages intended for a recipient software application to the recipient software application during a predetermined fault interval, determining, by the message broker subsystem, that the recipient software application is in a fault state after failing to deliver the one or more messages to the recipient software application during the predetermined fault interval, querying, by the message broker subsystem, a global service subsystem to identify an alternative recipient software application to the recipient software application, and automatically attempting, by the message broker subsystem, to deliver one or more other messages intended for the recipient software application to the alternative recipient software application in response to the determination that the recipient software application is in the fault state.

An exemplary system includes a delivery facility configured to deliver one or more messages intended for a recipient software application to the recipient software application during a predetermined fault interval, a fault surveillance facility communicatively coupled to the delivery facility and configured to determine that the recipient software application is in a fault state after failing to deliver the one or more messages to the recipient software application during the predetermined fault interval, and a fail-over processing facility configured to automatically perform a fail-over process on one or more other messages intended for the recipient software application in response to the determination that the recipient software application is in the fault state.

Another exemplary system includes a message broker configured to deliver messages to a recipient software application and a global directory service server selectively and communicatively coupled to the message broker and configured to maintain software application information data representative of a name of a software application designated as an alternative recipient software application for the recipient software application. The message broker is further configured to attempt to deliver one or more messages to the recipient software application during a predetermined fault interval, determine that the recipient software application is in a fault state after failing to deliver the one or more messages to the recipient software application during the predetermined fault interval, query the global directory service server for the software application information data, and automatically attempt to deliver at least one of the one or more messages to the alternative recipient software application in response to the determination that the recipient software application is in the fault state.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    attempting, by a message broker subsystem, to deliver one or more messages intended for a recipient software application to the recipient software application;
    determining, by the message broker subsystem, that the recipient software application is in a fault state after failing to deliver the one or more messages to the recipient software application;
    automatically performing, by the message broker subsystem, a fail-over process on one or more other messages intended for the recipient software application in response to the determination that the recipient software application is in the fault state; and continuing, by the message broker subsystem, to attempt to deliver a message selected from the one or more messages to the recipient software application while automatically performing the fail-over process on the one or more other messages.

2. The method of claim 1, wherein the automatic performing of the fail-over process comprises automatically delivering the one or more other messages intended for the recipient software application to an alternative recipient software application.

3. The method of claim 2, further comprising querying, by the message broker subsystem, a global directory service subsystem to identify the alternative recipient software application prior to automatically delivering the one or more other messages to the alternative recipient software application.

4. The method of claim 1, wherein the automatic performing of the fail-over process comprises returning the one or more other messages to one or more software applications that originated the one or more other messages.

5. The method of claim 1, wherein the automatically performing of the fail-over process is performed without attempting to deliver the one or more other messages to the recipient software application.

6. The method of claim 1, wherein the determining comprises determining that the recipient software application is in a fault state after failing to deliver the one or more messages to the recipient software application during a predetermined fault interval.

7. The method of claim 6, further comprising:
successfully delivering, by the message broker subsystem, the selected message to the recipient software application after the predetermined fault interval; and
ceasing, by the message broker subsystem, the automatic performing of the fail-over process in response to the successful delivering of the message to the recipient software application.

8. The method of claim 6, wherein the one or more other messages comprise one or more messages received and queued by the message broker subsystem before completion of the fault interval for delivery to the recipient software application.

9. The method of claim 6, wherein the one or more other messages comprise one or more messages received by the message broker subsystem after the fault interval.

10. The method of claim 1, embodied as computer-executable instructions on at least one non-transitory computer-readable medium.

11. A system comprising:
at least one computing device comprising
a delivery facility that attempts to deliver one or more messages intended for a recipient software application to the recipient software application during a predetermined fault interval,
a fault surveillance facility communicatively coupled to the delivery facility and that determines that the recipient software application is in a fault state after the delivery facility fails to deliver the one or more messages to the recipient software application during the predetermined fault interval, and
a fail-over processing facility that automatically performs a fail-over process on one or more other messages intended for the recipient software application in response to the determination that the recipient software application is in the fault state;
wherein the delivery facility continues to attempt to deliver a message selected from the one or more messages to the recipient software application after the predetermined fault interval while the fail-over processing facility performs the fail-over process on the one or more other messages.

12. The system of claim 11, wherein:
the delivery facility successfully delivers the selected message to the recipient software application after the predetermined fault interval, and
the fail-over processing facility ceases the automatic performing of the fail-over process in response to the successful delivery of the message to the recipient software application.

13. The system of claim 11, wherein the fail-over processing facility automatically performs the fail-over process by delivering the one or more other messages intended for the recipient software application to an alternative recipient software application.

14. The system of claim 13, wherein the delivery facility queries a global directory service subsystem to identify the alternative recipient software application prior to delivering the one or more other messages to the alternative recipient software application.

15. The system of claim 11, wherein the fail-over processing facility automatically performs the fail-over process by returning the one or more other messages to one or more software applications that originated the one or more other messages.

16. The system of claim 11, wherein the fail-over processing facility automatically performs the fail-over process without attempting to deliver the one or more other messages to the recipient software application after the predetermined fault interval.

17. A system comprising:
at least one computing device implementing a message broker subsystem, the at least one computing device comprising
a delivery facility that attempts to deliver one or more messages intended for a recipient software application to the recipient software application during a predetermined fault interval,
a fault surveillance facility communicatively coupled to the delivery facility and that determines that the recipient software application is in a fault state after the delivery facility fails to deliver the one or more messages to the recipient software application during the predetermined fault interval, and
a fail-over processing facility that automatically performs a fail-over process on one or more other messages intended for the recipient software application in response to the determination that the recipient software application is in the fault state; wherein
the delivery facility continues to attempt to deliver a message selected from the one or more messages to the recipient software application during a predetermined defunct interval following the predetermined fault interval,
the fault surveillance facility determines that the recipient software application is in a defunct state after failing to deliver the selected message to the recipient software application during the predetermined defunct interval, and
the fail-over processing facility terminates a connection between the message broker subsystem and the recipient software application in response to the determination that the recipient software application is in the defunct state.

18. The system of claim 17, wherein the fail-over processing facility automatically performs the fail-over process by returning the one or more other messages to one or more software applications that originated the one or more other messages.

19. The system of claim 17, wherein the fail-over processing facility automatically performs the fail-over process without attempting to deliver the one or more other messages to the recipient software application after the predetermined fault interval.

20. The system of claim 17, wherein the one or more other messages comprise one or more messages received and queued by the message broker subsystem before completion of the fault interval for delivery to the recipient software application.

21. The system of claim 17, wherein the one or more other messages comprise one or more messages received by the message broker subsystem after the fault interval.

* * * * *